United States Patent Office 3,743,567
Patented July 3, 1973

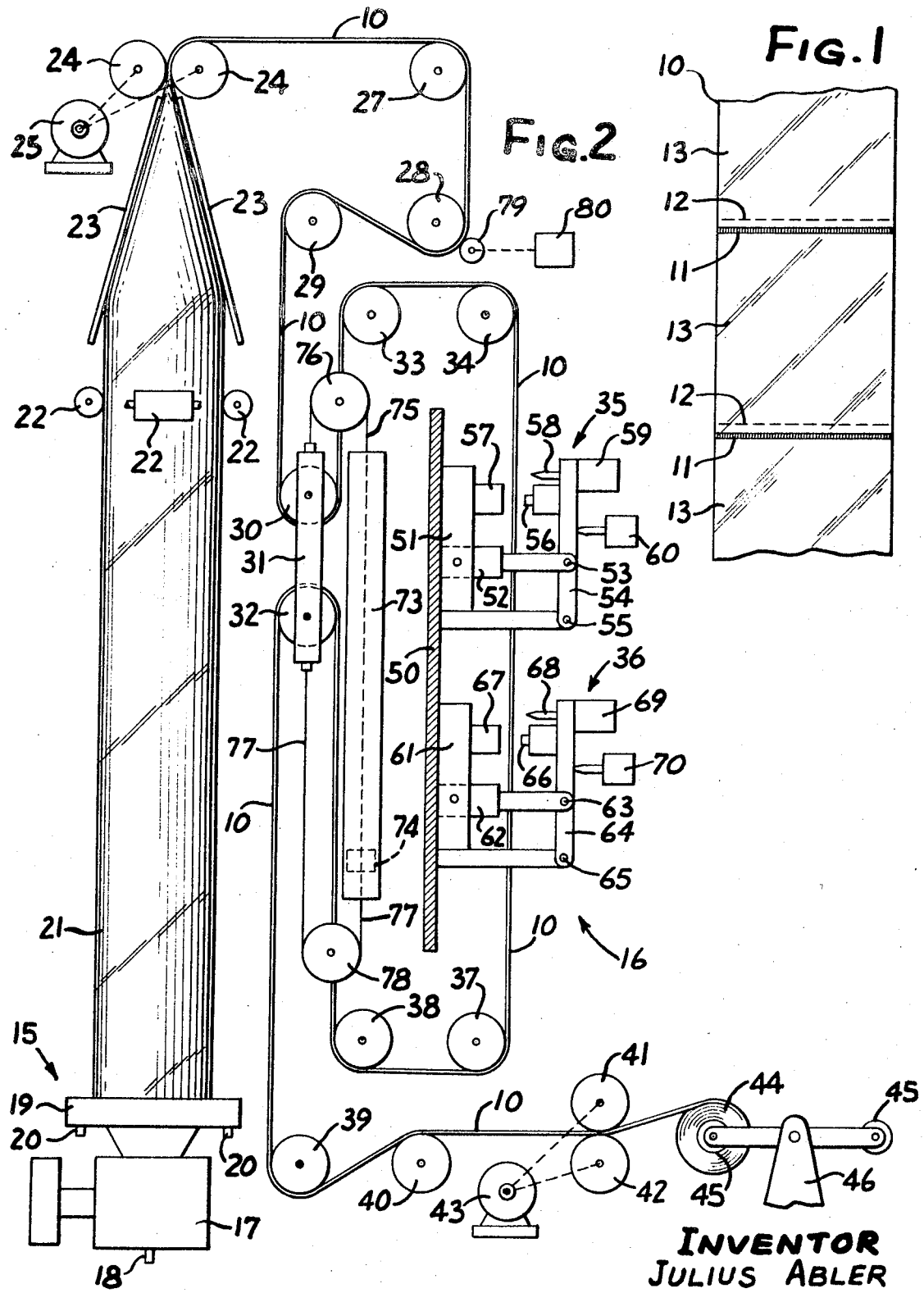

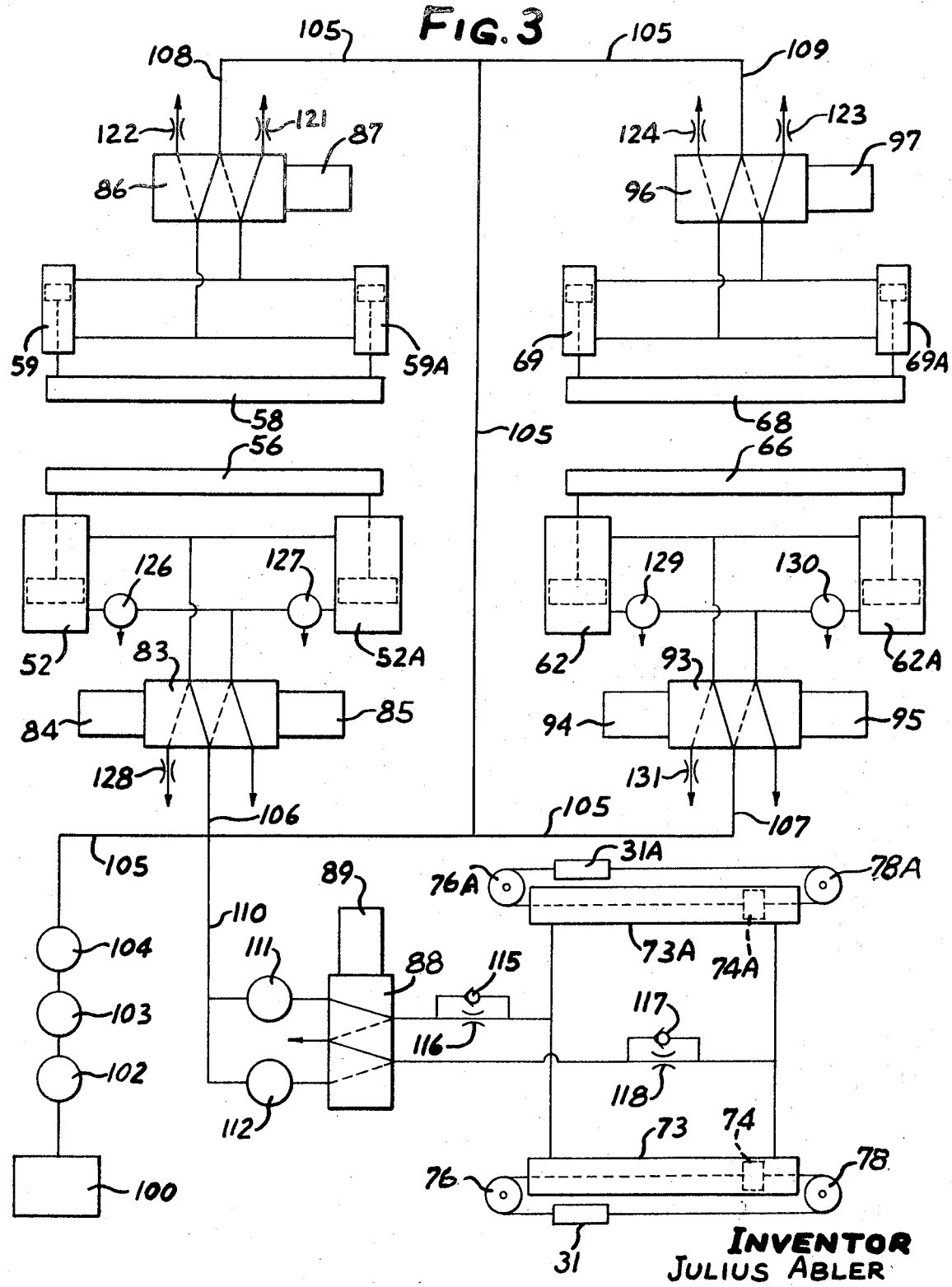

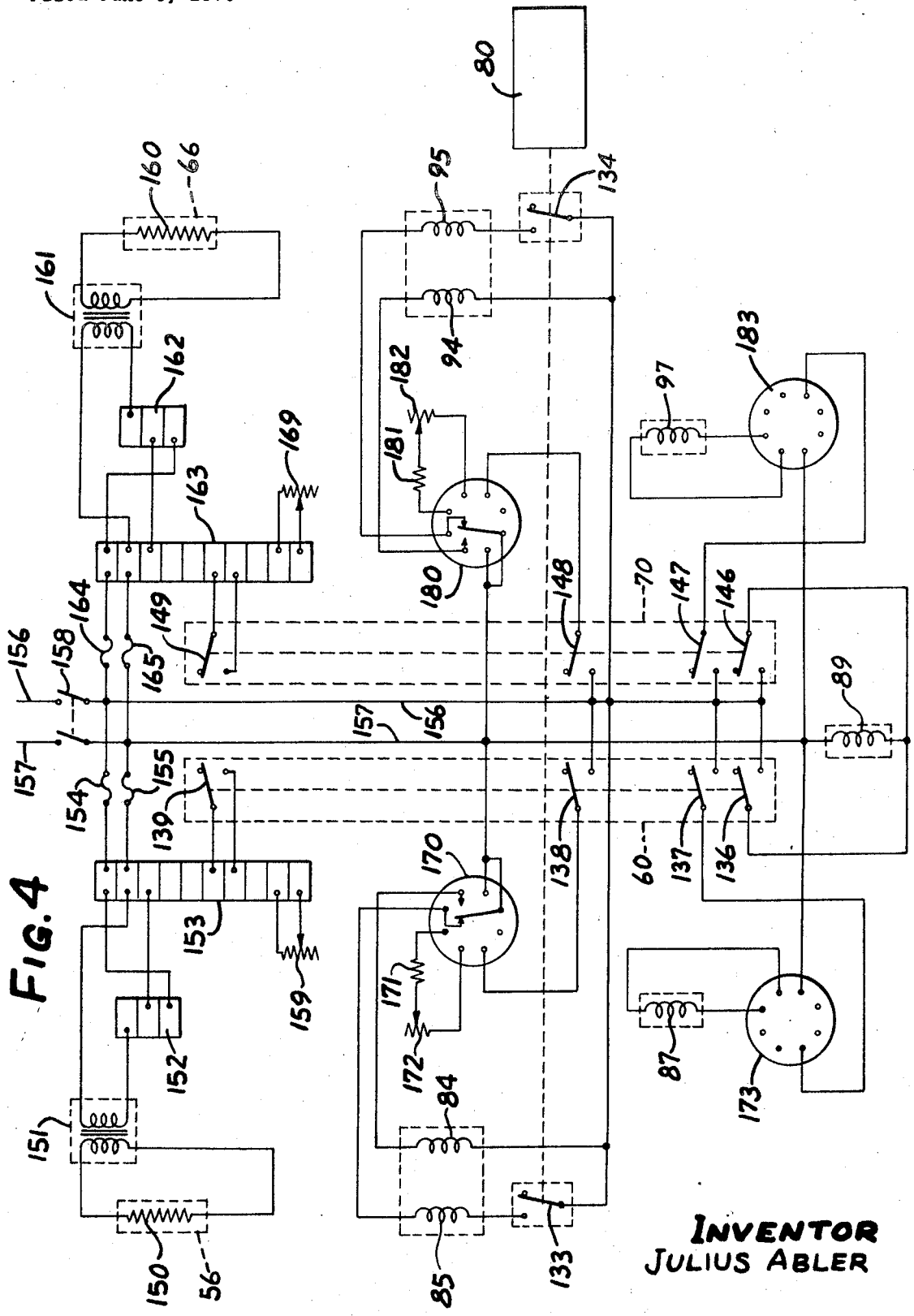

---

3,743,567
METHOD AND APPARATUS FOR FORMING
THERMOPLASTIC BAGS
Julius Abler, Little St. Mary's Road,
Libertyville, Ill. 60048
Filed June 8, 1970, Ser. No. 44,425
Int. Cl. B32b 31/20; B31b 1/14
U.S. Cl. 156—553                    22 Claims

ABSTRACT OF THE DISCLOSURE

An inflated seamless thermoplastic tube is continuously extruded from a thermoplastic melt and is continuously flattened into a flattened web of such tubing, the web being simultaneously continuously longitudinally fed at a substantially constant speed. The longitudinal movement of the continuously fed web is intermittently stopped and transversely heat sealed and perforated when it is stopped to provide the web with longitudinally spaced heat seals and perforations defining separably connected bags therein. The heat sealed and perforated web is continuously longitudinally withdrawn at a substantially constant speed corresponding to the substantially constant feeding speed. Slack is provided in the continuously fed web and the continuously withdrawn web to allow stopping of the web for heat sealing and perforating purposes. The slack in the fed web is paid out and in the withdrawn web is taken up equally when the web is not stopped and the slack in the withdrawn web is paid out and in the fed web is taken up equally when the web is stopped for equalizing and maintaining substantially constant tension in the entire fed and withdrawn web. The continuously withdrawn heat sealed and perforated web is preferably wound in a roll for ease in subsequent handling.

---

The principal object of this invention is to provide an "in line" method and apparatus for continuously forming from a thermoplastic melt a plurality of separably connected thermoplastic bags in flattened condition in the form of a continuous web. By reason of this "in line" method and apparatus of this invention, such thermoplastic bags may be most advantageously produced in an inexpensive manner, with minimum handling of materials and with minimum use of floor space and equipment.

Briefly, in accordance with this aspect of the invention, there is preferably provided an "in line" combination of an extruding apparatus for continuously blow extruding from a thermoplastic melt an inflated seamless thermoplastic tube which is continuously flattened and longitudinally fed at a substantially constant speed by means including feeding rolls, and an apparatus including a heat sealing and perforting unit for simultaneously providing said web with longitudinally spaced transverse heat seals and perforations for defining separably connected bags therein and means including withdrawing rolls for simultaneously continuously withdrawing the heat sealed and perforated web at a substantially constant speed corresponding to the substantially constant feeding speed.

The heat sealing and perforating unit stops the longitudinal movement of the web while it is transversely heat sealing and perforating the web. Slack is provided in the web continuously fed to the heat sealing and perforating unit and in the web continuously withdrawn from the heat sealing and perforating unit to allow stopping of the web for the heat sealing and perforating operation. Web tension maintaining and equalizing means, including a movable carrier having a roll engaging the fed web and a roll engaging the withdrawn web, operates to equally pay out the slack in the fed web and take up the slack in the withdrawn web when the heat sealing and perforating unit is not stopping the web and to equally pay out the slack in the withdrawn web and take up the slack in the fed web when the heat sealing and perforating unit is stopping the web for equalizing and maintaining substantially constant tension in the entire fed and withdrawn web.

The heat sealing and perforating unit and the web tension maintaining and equalizing means are operated in timed relation and are controlled by the advancing web so as to provide the web with the transverse heat seals and perforations at desired selected points along the web to define the separable bags therein. The operation of the heat sealing and perforating unit and the web tension maintaining and equalizing means may be adjusted to provide separable bags of desired length and, also, a plurality of heat sealing and perforating units may be utilized to multiply the production of such bags by the apparatus.

While it is preferable to utilize in the "in line" combination an extruding apparatus for continuously blow extruding from a thermoplastic melt an inflated seamless thermoplastic tube which is continuously flattened into a flattened web, other types of apparatus may be utilized in the "in line" combination for continuously forming a web of flattened thermoplastic tubing. The apparatus of this invention, including the feeding rolls, the withdrawing rolls, the heat sealing and perforating unit and the web tension maintaining and equalizing means, may also be supplied with flattened thermoplastic tubing from a previously formed roll of such tubing but, here, however, the benefits of the "in line" combination are lost.

Further objects of this invention reside in the details of construction of the apparatus, in the relationships between the component parts thereof, and in the method and relationship between the method steps in forming the separably connected thermoplastic bags in flattened condition in the form of a continuous web.

Other objects and advantages of this invention will become apparent to those skilled in the art upon reference to the accompanying specification, claims and drawings in which:

FIG. 1 is a side view of a web of flattened thermoplastic tubing which is transversely heat sealed and perforated to define separable thermoplastic bags therein;

FIG. 2 is a diagrammatic illustration of the "in line" apparatus of this invention for continuously forming from a thermoplastic melt a plurality of separably connected thermopastic bags in flattened condition in the form of a continuous web as illustrated in FIG. 1;

FIG. 3 is a diagrammatic illustration of the pneumatic control apparatus for controlling the operation of the apparatus of FIG. 2; and FIG. 4 is a diagrammatic illustration of electrical apparatus of FIG. 3.

Referring now to FIG. 1, there is illustrated a continhous web 10 of thermoplastic tubing which has been flattened and which has been provided with longitudinally spaced transverse heat seals 11 and adjacent transverse perforations 12 for defining separably connected thermoplastic bags 13 in flattened condition in the form of a continuous web.

A method and apparatus for forming the separably connected thermoplastic bags 13 of FIG. 1 are diagrammatically illustrated in FIG. 2. The apparatus is an "in line" apparatus including an extruding means generally designated at 15 for continuously blow extruding from a thermoplastic melt an inflated seamless thermoplastic tube which is flattened into a web, and a mechanism generally designated at 16 for providing the flattened web with the transverse seals 11 and perforations 12. The extruding means includes a die 17 for continuously extruding at a substantially constant rate from a thermoplastic melt a tubular thermoplastic film. An air supply connection 18 supplies air into the interior of the extruded thermoplastic film for blow expanding the film, under the control of an air ring 19 provided with air inlets 20, into an inflated seamless thermoplastic tube 21. The continuously extruded inflated seamless thermoplastic tube 21 is guided by guide rolls 22 and is collapsed by collapsers 23 and feed rolls 24 into a collapsed tubular seamless thermoplastic web 10. The feed rolls 24 are operated at a substantially constant speed by a variable speed motor 25 which is controlled to feed the web 10 at the same speed at which the inflated seamless thermoplastic tube is extruded and formed.

The flattened web 10 is fed by the feed rolls 24 over idler pulleys 27, 28 and 29, over a roll 30 of a movable carrier 31, 31A having another roll 32, over idler rolls 33 and 34 through a pair of heat sealing and perforating units 35 and 36, over a pair of idler rollers 37 and 38, over the other roller 32 of the movable carrier 31, 31A and over idler rolls 39 and 40 to a pair of withdrawing rolls 41 and 42 driven by a variable speed motor 43. The variable speed motor 43 continuously drives the withdrawing rolls 41 and 42 at a substantially constant speed which corresponds to the substantially constant speed of the feed rolls 24 driven by the variable speed motor 25. The heat sealing and perforating units 35 and 36 operate to provide the heat seals 11 and the perforations 12 to the thermoplastic web 10 as illustrated in FIG. 1. While two heat sealing and perforating units 35 and 36 are shown for purposes of illustration, one of them may be omitted or additional units may be provided as desired.

The heat sealed and perforated web 10 which is continuously withdrawn by the withdrawing rolls 41 and 42 may be wound into roll form as indicated at 44 on mandrels 45 of a wind up apparatus 46 for subsequent convenient handling.

The idler rolls 27, 28, 29, 33, 34, 37, 38, 39 and 40 may be carried by a suitable frame (not shown) and the heat sealing and perforating units 35 and 36 are longitudinally adjustably carried by a part 50 of that frame. The heat sealing and perforating unit 35 includes a base 51 which is longitudinally adjustably secured to the frame part 50 and which includes on one side of the web 10 a pneumatic cylinder 52 which is connected at 53 to a lever 54 pivoted at 55. On the other side of the web 10 the base 51 also carries a pneumatic cylinder 52A (not shown in FIG. 2 but shown in FIG. 3) which is correspondingly connected at 53A to a lever 54A pivoted at 55A. The two levers 54 and 54A carry a heat sealing bar 56 which is adapted to heat seal the thermoplastic web 10 between it and an anvil bar 57 carried by the base 51 when the pneumatic cylinders 52, 52A are operated to move the heat sealing bar 56 toward the anvil bar 57. Each lever 54 and 54A also carries a pneumatic cylinder 59 and 59A which are connected to a perforating bar or blade 58 so that when the heat sealing bar 56 is clamping and heat sealing the thermoplastic web 10, the bar or blade 58 is operated to perforate the thermoplastic web 10 when the pneumatic cylinders 59 and 59A are operated. When the levers 54 and 54A are operated to the position to clamp and heat seal the thermoplastic web 10, a switch 60 is actuated.

Likewise, the heat sealing and perforating unit 36 is longitudinally adjustably mounted on the frame part 50. The heat sealing and perforating unit 36 includes a base 61 which is longitudinally adjustably secured to the frame part 50 and which includes on one side of the web 10 a pneumatic cylinder 62 which is connected at 63 to a lever 64 pivoted at 65. On the other side of the web 10 the base 61 also carries a pneumatic cylinder 62A (not shown in FIG. 2 but shown in FIG. 3) which is connected at 63A to a lever 64A pivoted at 65A. The two levers 64 and 64A carry a heat sealing bar 66 which is adapted to heat seal the thermoplastic web 10 between it and an anvil bar 67 carried by the base 61 when the pneumatic cylinders 62 and 62A are operated to move the heat sealing bar 66 toward the anvil bar 67. Each lever 64 and 64A also carries a pneumatic cylinder 69 and 69A which are connected to a perforating bar or blade 68 so that when the heat sealing bar 66 is clamping and heat sealing the thermoplastic web 10 the bar 68 is operated to perforate the thermoplastic web 10 the bar 68 is operated to perforate the thermoplastic web 10 when the pneumatic cylinders 69 and 69A are operated. When the levers 64 and 64A are operated to the position to clamp and heat seal the thermoplastic web 10, a switch 70 is actuated.

The tension maintaining and equalizing means including the carrier 31, 31A and the rolls 30 and 32 carried thereby is operated by pneumatic cylinders 73, 73A having pistons 74, 74A. One side of the pistons 74, 74A is connected through cables 75, 75A around pulleys 76, 76A to one end of the carrier 31, 31A and the other end of the pistons 74, 74A is connected by cables 77, 77A around pulleys 78, 78A to the other end of the carrier 31, 31A. The pulleys (6 and 78 are carried by the apparatus frame 7 not shown). As the (pneumatic cylinders 73, 73A are operated to move the pistons 74, 74A upwardly, as illustrated in FIG. 2, the carrier 31, 31A is moved downwardly and vice versa as the pneumatic cylinders 73, 73A are operated in the opposite direction to move the pistons 74, 74A downwardly the carrier 31, 31A is moved upwardly.

The heat sealing and perforating units 35 and 36 in performing their heat sealing and perforating functions operate to stop advancing movement of the web, the stopping as illustrated in FIG. 2 being accomplished by the heat sealing bars 56 and 66 clamping the web 10 against the anvils 57 and 67. If desired, additional clamping means for stopping advancing of the web 10 may be provided. In order to accommodate this stopping of the web 10 while it is being heat sealed and perforated by the heat sealing and perforating units 35 and 36, the fed web 10 is provided with slack and so is the withdrawn web 10. The rollers 30 and 32 of the carrier 31 provide a tension maintaining and equalizing means for the web 10 so as to equalize and maintain substantially constant tension in the entire fed and withdrawn web 10.

As illustrated in FIG. 2, the carrier 31 is movable upwardly for equally paying out the slack in the web 10 fed by the feeding rolls 24 and taking up the slack in the web 10 withdrawn by the withdrawing rolls 41, 42 when the heat sealing and perforating units 35 and 36 are not stopping the web. When the heat sealing units 35 and 36 are operated to stop the movement of the web for heat sealing and perforating purposes, the carrier 31 is moved downwardly for equally paying out the slack in the web 10, withdrawn by the withdrawing rolls 41, 42 and taking up the slack in the web 10, fed by the feeding rolls 24. By so equally paying out and taking up the slack in the fed and withdrawing webs the tension in the entire web 10 is equalized and maintained substantially constant. Thus, the web 10 which is continuously fed by the feeding rolls 24 and continuously withdrawn by the withdrawing rolls 41, 42 may be intermittently stopped between the feeding rolls 24 and the withdrawing rolls 41, 42 to allow the transverse heat sealing and perforation of the web at the heat sealing and perforating units 35 and 36 and at the same time the tension of the web 10 is at all times equalized and maintained substantially constant.

The pneumatic cylinders 59, 59A, 69, 69A, 60, 60A, 70 and 70A of the heat sealing and perforating units 35 and 36 and the pneumatic cylinders 73 and 73A of the tension maintaining and equalizing means are operated in timed relation. To control the operation of these pneumatic cylinders a counter 80 having a roller 79 engaging the web 10 at one of the idler rolls, as for example the idler roll 28, is utilized. This counter 80 counts the amount of advance of the web 10 through the apparatus and at a predetermined count determined by the amount of the web which is fed produces the control action and at the same time resets itself for another counting sequence.

Referring more particularly to FIG. 3, the pneumatic cylinders 52 and 52A of the heat sealing and perforating unit 35 are controlled by a valve 83 which in turn is controlled by solenoids 84 and 85. Likewise, the pneumatic cylinders 62 and 62A of the heat sealing and perforating unit 36 are controlled by a valve 93 which in turn is controlled by solenoids 94 and 95. The pneumatic cylinders 59 and 59A of the heat sealing and perforating unit 35 are controlled by a valve 86 which in turn is controlled by a solenoid 87. Likewise, the pneumatic cylinders 69 and 69A of the heat sealing and perforating unit 36 are controlled by a valve 96 which in turn is controlled by a solenoid 97. The pneumatic cylinders 73 and 73A for operating the carrier 31, 31A of the tension equalizing and maintaining means are controlled by a valve 88 which in turn is controlled by a solenoid 89.

Air under pressure is supplied to the pneumatic system of FIG. 3 from a source of air under pressure 100 through a filter 102, a pressure regulator 103 and a lubricator 104 to a manifold 105. Branch conduits 106 and 107 leading from the manifold 105 supply air under pressure to the valves 83 and 93. Likewise, conduits 108 and 109 supply air under pressure from the manifold 105 to the valves 86 and 96. A conduit 110 supplies air under pressure from the manifold 105 through pressure regulators 111 and 112 to the valve 88.

With the parts of the apparatus in the positions illustrated in FIGS. 2 and 3, air under pressure is supplied through the pressure regulator 111, valve 88 and check valve 115 to the upper ends of the pneumatic cylinders 73 and 73A to cause the pistons 74 and 74A to move the carrier 31, 31A of the tension equilizing and maintaining means to the upper position as illustrated in FIG. 2. Air behind the pistons 74 and 74A is exhausted through an adjustable restriction 118 in parallel with a check valve 117 through the valve 88 to exhaust. Thus, the movement of the tension maintaining and equalizing means to the position illustrated in FIG. 2 is controlled by the pressure regulator 111 and the adjustable restriction 118. When the valve 88 is moved to the opposite position by the solenoid 89, air under pressure is supplied through the pressure regulator 112, the valve 88 and the check valve 117 to the under sides of the pistons 74 and 74A of the pneumatic cylinders 73 and 73A and air is exhausted from the cylinders 73 and 73A through an adjustable restriction 116 and the valve 88 to exhaust. Thus, the movement of the carrier 31, 31A from the raised position illustrated in FIG. 2 to the lowered position is determined by the pressure regulator 112 and the adjustable restriction 116. By suitably adjusting the pressure regulators 111 and 112 and the adjustable restrictions 116 and 118 the speed of movement of the carrier 31, 31A of the tension equalizing and maintaining means between its raised and lowered positions and the amount of such movement during a particular time interval may be regulated at will. Generally speaking, the carrier 31, 31A is normally rapidly raised to a fixed position during each cycle of operation and is lowered at a rate and to an extent dependent upon the length of the thermoplastic bags 13 to be formed in the thermoplastic web 10.

As illustrated in FIG. 2, where two heat sealing and perforating units 35 and 36 are utilized, the carrier 31, 31A is moved through a distance corresponding to the length of one thermoplastic bag which in turn causes the web to move the distance of two thermoplastic bags. As a result, two thermoplastic bags 13 are formed during each cycle of operation. Where only one heat sealing and perforating unit, such as the unit 35, is utilized the carrier 31 of the tension equalizing and maintaining means is moved a distance corresponding only to one-half the length of one thermoplastic bag 13 so that only one bag is formed during each cycle of operation.

With reference to the operation of the perforator blade 58, air under pressure passes through the valve 86 to the undersides of the pistons in the pneumatic cylinders 59 and 59A and air is exhausted from the uppersides of these pistons through the adjustable restriction 121 to exhaust. This occurs when the solonoid 87 is de-energized and operates to retract the perforator blade 58. Likewise, air under pressure passes through the valve 96 when the solenoid 97 is de-energized to the underside of the pistons in the pneumatic cylinders 69 and 69A and air is exhausted from the uppersides of these pistons through the valve 96 and the variable restriction 123 to exhaust. As a result, the perforating blade 68 is retracted. These represent the normal positions of the parts for operating the perforating blades 58 and 68.

When the solenoid 87 is energized, the valve 86 is operated to supply air under pressure to the upper sides of the pistons in the pneumatic cylinders 59 and 59A and to exhaust air from the undersides of these pistons through the valve 86 and the variable restriction 122 to exhaust. This causes advancing of the perforator blade 58 for perforating the web and the speed of such advance is regulated by the variable restriction 122. Likewise, when the solenoid 97 is energized, the valve 96 is operated to supply air under pressure to the upper sides of the pistons in the pneumatic cylinders 69 and 69A and air is exhausted from the undersides of these pistons through the valve 96 and variable restriction 124 to exhaust. Here, also, the perforating blade 68 is advanced and the rate of advance is determined by the variable restriction 124. The variable restrictions 121 and 123 operate to control the rate of retraction of the perforating blades 58 and 68.

With respect to the operation of the sealing bar 56, the valve 83 is normally in the position illustrated as a result of previous energization of the solenoid 84. Here, air under pressure is supplied through the valve 83 to the upper sides of the pistons in the pneumatic cylinders 52 and 52A and air is exhausted from the undersides of the pistons through quick exhaust valves 126 and 127 to exhaust under the control of an exhaust passage leading from these quick exhaust valves to exhaust through the valve 83. As a result, the heat sealing bar 56 is rapidly retracted. When the solenoid 85 is energized, the valve 83 is shifted to supply air under pressure through the valve 83 and the quick exhaust valves 126 and 127 to the undersides of the pistons in the pneumatic cylinders 52 and 52A and air above these pistons is exhausted through the valve 83 and a variable restriction 128 to exhaust. As a result, the heat sealing bar 56 is advanced and it is advanced at a rate depending upon the variable restriction 128.

Likewise, the heat sealing bar 66 is normally retracted with the parts in the position illustrated in FIG. 3 as a result of prior energization of the solenoid 95. Here, air is supplied through the valve 93 to the uppersides of the pistons in the pneumatic cylinders 62 and 62A and air is exhausted from below these pistons through the quick exhaust valves 129 and 130 under the control of an exhaust passage extending through the valve 93 to exhaust. Thus, the heat sealing bar 66 is rapidly retracted. When the solenoid 94 is energized, the valve 93 is shifted to supply air under pressure through the valve 93 and the quick exhaust valves 129 and 130 below the pistons in the pneumatic cylinders 62 and 62A and air is exhausted from above these pistons through the valve 93 and the variable restriction 131. In this way, the heat sealing bar 66 is advanced and the rate of advance is regulated by the variable restriction 131.

The manner in which the various solenoids illustrated in FIG. 3 is operated is diagrammatically illustrated in FIG. 4. Here, the counter 80 which is controlled by the advance of the web 10 in FIG. 2 counts as the web is advanced and after a predetermined count determined by the advance of the web, the counter 80 resets itself and closes switches 133 and 134 for a short time interval of, for example five-tenths second to provide a five-tenths second impulse. After this five-tenths second interval the switches 133 and 134 open.

The switch 60 which is operated by the movement of the heat sealing bar 56 includes a plurality of normally open switches 136, 137, 138 and 139. These switches are closed when the heat sealing bar 56 is moved to heat sealing position against the anvil 57. Likewise, the switch 70 operated upon movement of the heat sealing bar 66 includes a plurality of normally open switches 146, 147, 148 and 149 which are closed when the heat sealing bar 66 is moved into heat sealing position against the anvil 67 by the pneumatic cylinders 62 and 62A.

The heat sealing bars 56 and 66 carry electrical heaters 150 and 160, respectively for heating the web 10 during the heat sealing operation. The heater 150 is powered by a transformer 151 which in turn is controlled by a solid state relay 152. The transformer 151 and the solid state relay 152 are connected to a terminal strip 153 and through fuses 154 and 155 to electrical line wires 156 and 157 having a switch 158 therein for controlling the supply of electrical energy to the electrical circuit. The switch 139 is connected to the terminal strip 153 as is a heater timer 159. When the switch 139 is closed, the solid state relay 152 is controlled to energize the transformer 151 to heat the heater 150 and after a time interval determined by the heater timer 159 the solid state relay 152 is operated to de-energize the transformer 151 to shut off the power to the heater 150 and allow the same to cool.

Likewise, the heater 160 for the heat sealing bar 66 is supplied with power by a transformer 161 controlled by a solid state relay 162, the transformer 161 and the solid state relay 162 being connected to a terminal strip 163 and through fuses 164 and 165 to the line wires 156 and 157. The switch 149 of the switch 70 is connected to the terminal strip 163 and also a heater timer 169 is connected to the terminal strip 163. When the switch 149 is closed, the solid state relay 162 energizes the transformer 161 to supply power to the heater 160 of the heat sealing bar 66 and after an interval of time determined by the heater timer 169 the solid state relay 162 is controlled to de-energize the transformer 161 and interrupt the supply of power to the heater 160 of the heat sealing bar 66 to allow the same to cool.

The solenoids 84 and 85 which operate the valve 83 controlling the operation of the heat sealing bar 56 is accomplished through a dwell timer 170 having a timing circuit including a resistance 171 and a rheostat 172. When the switch 133 of the counter 80 is closed for the five-tenths second interval, a circuit is completed from the line wire 156 through the switch 133, the solenoid 85 and the dwell timer 170 to the other line wire 157 for energizing the solenoid 85 to shift the valve 83 and cause the heater bar 56 to advance against the anvil 57. After this time interval the solenoid 85 is de-energized but the valve 83 remains in the shifted position. When the switch 138 of the switch 60 is closed the dwell timer 170 is operated and at the end of the timing period determined by the resistance 171 and the rheostat 172 the dwell timer switches and completes a circuit from the line wire 156 through the solonoid 84 and the dwell timer 170 to the other line wire 157. As a result, the solenoid 84 is energized to shift the valve 83 to the position illustrated in FIG. 3 for retracting the heat sealing bar 56. After performing this operation which energizes the solenoid 84 the dwell timer 170 then resets itself for the next cycle of operation.

Likewise, the circuits for the solenoids 94 and 95 for operating the heat sealing bar 66 includes a dwell timer 180 controlled by a resistance 181 and a rheostat 182. When the switch 134 of the counter 80 is closed for the five-tenth second interval, a circuit is completed from the line wire 156 through the switch 134, the solenoid 95 and the dwell timer 180 to the line wire 157 for energizing the solenoid 95 which switches the valve 94 from the position illustrated in FIG. 3 to advance the heat sealing bar 66 against the anvil 67. When the switch 148 of the switch 70 is closed, the dwell timer 180 is energized and after the time interval thereof it operates to complete a circuit from the line wire 156 through the solenoid 94 and the dwell timer 180 to the line wire 157 for energizing the solenoid 94 to shift the valve 93 to the position illustrated in FIG. 3 for retracting the heat sealing bar 66. Following this energization of the solenoid 94 the dwell timer 180 resets itself.

The solenoid 87 which controls the valve 86 for operating the perforating blade 58 is controlled by a perforator timer 73 and the solenoid 97 which operates the control valve 96 for controlling the operation of the perforator blade 68 is controlled by a perforator timer 183. When the switch 137 of the switch 60 is closed, a circuit is completed from the line wire 156 through the perforator timer 173 and the solenoid 87 back to the line wire 157 for energizing the solenoid 87 for a time interval for advancing the perforator blade 58 for the time interval. After the time interval, the solenoid 87 is de-energized and the perforating blade 58 is retracted. Likewise, when the switch 147 is closed, a circuit is completed from the line wire 156 through the perforator timer 183 and the solenoid 97 back to the line wire 157 for energizing the solenoid 97 for an interval of time for operating the valve 96 to advance the perforating blade 68 for the interval of time. When the time interval elapses, the solenoid 97 is deenergized and the perforator blade 68 is retracted.

When either switch 136 of the switch 60 or the switch 146 of the switch 70 is closed, a circuit is completed from the line wire 156 through either of these switches 136 or 146 and the solenoid 89 to the line wire 157 for operating the valve 88 to reverse the movement of the carrier 31, 31A and move the same downwardly. This solenoid 89 remains energized and the downward movement of the carrier 31, 31A continuous until both switches 136 and 146 are opened whereupon the valve 88 is shifted to the position illustrated in FIG. 3 to raise the carrier 31, 31A.

With the parts in the positions shown in FIGS. 2, 3 and 4, the carrier 31, 31A is in its upper position and all solenoids and relays are de-energized. The counter 90 actuated by the roller 79 driven from the web 10 reaches its present number count and causes the counter to reset to zero and resume counting. Simultaneously the switches 133 and 134 are closed and an output pulse of approximately five-tenths second is applied to the solenoids 85 and 95 shifting their respective valves 83 and 93 with the result that the heat sealing bars 56 and 66 are advanced against the anvil bars 57 and 67 under the control of the variable restrictions 128 and 131 in the exhausts from the valves 83 and 93 to clamp and stop the web 10. The first switch 60 or 70 on either heat sealing and perforating unit 35 or 36 to close as a result of such advance of the heat sealing bars 56 or 66 actuates the solenoid 89 through switches 136 or 146 to shift the valve 88 and cause the carrier 31, 31A to move downwardly, as the web 10 is thein stopped by either of the heat sealing bars 56 or 66. The closure of the switches 137 and 147 of the switches 60 and 70 initiates the perforator cycle by actuating the solenoids 87 and 97 through their respective perforator timers 173 and 183. Operation of these solenoids 87 and 97 advances the perforating blades 58 and 68 to perforate the web 10 clamped and stopped by the heat sealing bars 56 and 66. Closure of the switches 138 and 148 initiates the dwell timers 170 and 180 for the total closed cycle control. When the valve 88 is reversed by the solenoid 89, the carrier 31, 31A moves downwardly with air supplied through the pressure regulator 111 (the exhaust being controlled by the variable restriction 118) controlling the web tension in the entire web.

When either timing circuit for the heater elements 150 or 160 times out, the heater elements are de-energized by the solid state relays 152 or 162 and the heater elements begin to cool. When either of the perforator timers 173 or 183 time out, the solenoids 87 and 97 are de-energized to operate the valves 86 or 96 for withdrawing the perforating blades 58 or 68 from the web 10. When the dwell timers 170 or 180 time out, the solenoids 84 or 94 are pulsed for operating the valves 83 or 93 for retracting their respective heat sealing bars 56 or 66. When both heater bars 56 and 66 are retracted, the switches 136 and 146 are then both opened to allow de-energization of the solenoid 89 to operate the valve 88 to raise the carrier 31, 31A. The carrier moves to the raised position rapidly by reason of the pressure regulator 112 and the variable restriction 116 and in so doing, it advances the web along the heat sealing and perforating units 35 and 36 to a new position for the next subsequent heat sealing and perforating operation. For bag length accuracy the carrier 31, 31A should reach its top position before the counter 80 initiates another counting cycle.

While for purposes of illustration one form of this invention has been disclosed, other forms thereof may become apparent to those skilled in the art upon reference to this disclosure and, therefore, this invention should be limited only by the scope of the appended claims.

I claim:

1. The method of continuously forming a plurality of separably connected thermoplastic bags in flattened condition in the form of a continuous web comprising the steps of, continuous blow extruding from a thermoplastic melt an inflated seamless thermoplastic tube, continuously flattening said continuously extruded thermoplastic tube into a web of flattened thermoplastic seamless tubing and simultaneously continuously longitudinally feeding said web at a substantially constant speed, intermittently positively stopping longitudinal movement of said web so continuously fed at a stationary position and transversely heat sealing and perforating said web when it is so stopped to provide said web with longitudinally spaced transverse heat seals and perforations defining said separably connected bags therein, continuously longitudinally withdrawing said heat sealed and perforated web defining the bags therein at a substantially constant speed corresponding to the substantially constant feeding speed, providing slack in the fed web and in the withdrawn web to allow longitudinal movement of the web and stopping of the web for longitudinally spaced heat sealing and perforating purposes, equally paying out the slack in the fed web and taking up the slack in the withdrawn web when the longitudinal movement of the web is not stopped and equally paying out the slack in the withdrawn web and taking up slack in the fed web when the longitudinal movement of the web is stopped for equalizing and maintaining substantially constant tension in the entire fed and withdrawn web.

2. The method of continuously forming a plurality of separably connected thermoplastic bags in flattened condition in the form of a continuous web comprising the steps of, continuously forming a web of flattened thermoplastic tubing and simultaneously continuously longitudinally feeding said web at a substantially constant speed, intermittently positively stopping longitudinal movement of said web so continuously fed at a stationary position and transversely heat sealing and perforating said web when it is so stopped to provide said web with longitudinally spaced transverse heat seals and perforations defining said separably connected bags therein, continuously longitudinally withdrawing said heat sealed and perforated web defining the bags therein at a substantially constant speed corresponding to the substantially constant feeding speed, providing slack in the fed web and in the withdrawn web to allow longitudinal movement of the web and stopping of the web for longitudinally spaced heat sealing and perforating purposes, equally paying out the slack in the fed web and taking up the slack in the withdrawn web when the longitudinal movement of the web is not stopped and equally paying out the slack in the withdrawn web and taking up slack in the fed web when the longitudinal movement of the web is stopped for equalizing and maintaining substantially constant tension in the entire fed and withdrawn web.

3. The method of forming a plurality of separably connected thermoplastic bags in flattened condition in the form of a web, comprising the step of, continuously longitudinally feeding at a substantially constant speed a web of flattened thermoplastic tubing, intermittently positively longitudinal movement of said web so continuously fed at a stationary position and transversely heat sealing and perforating said web when it is so stopped to provide said web with longitudinally spaced transverse heat seals and perforations defining said separably connected bags therein, continuously longitudinally withdrawing said heat sealed and perforated web defining the bags therein at a substantially constant speed corresponding to the substantially constant feeding speed, providing slack in the fed web and in the withdrawn web to allow longitudinal movement of the web and stopping of the web for longitudinally spaced heat sealing and perforating purposes, equally paying out the slack in the fed web and taking up the slack in the withdrawn web when the longitudinal movement of the web is not stopped and equally paying out the slack in the withdrawn web and taking up slack in the fed web when the longitudinal movement of the web is stopped for equalizing and maintaining substantially constant tension in the entire fed and withdrawn web.

4. Apparatus for continuously forming a plurality of separably connected thermoplastic bags in flattened condition in the form of a continuous web comprising in combination, extruding means for continuous blow extruding from a thermoplastic web an inflated seamless thermoplastic tube, means including feeding rolls for continuously flattening said continuously extruded thermoplastic tube into a web of flattened thermoplastic seamless tubing and simultaneously continuously longitudinally feeding said web at a substantially constant speed, a stationarily positioned heat sealing and perforating unit for intermittently positively stopping said web so continuously fed and transversely heat sealing and perforating said web when it is so stopped to provide said web with longitudinally spaced transverse heat seals and perforations defining said separably connected bags therein, means including withdrawing rolls for continuously longitudinally withdrawing said heat sealed and perforated web defining the bags therein at a substantially constant speed corresponding to the substantially constant feeding speed, the continuously fed web between the feeding rolls and the heat sealing and perforating unit and the continuously withdrawn web between the heat sealing and perforating unit and the withdrawing rolls being provided with slack to allow longitudinal movement of the web and stopping of the web at the heat sealing and perforating unit for longitudinally spaced heat sealing and perforating purposes, and a web tension maintaining and equalizing means including a movable carrier having a roll engaging the fed web between the feeding rolls and the heat sealing and perforating unit and a roll engaging the withdrawn web between the heat sealing and perforating unit and the withdrawing rolls, said carrier of said web tension maintaining and equalizing means being movable in one direction for equally paying out the slack in the web fed by the feeding rolls and taking up the slack in the web withdrawn by the withdrawing rolls when the heat sealing and perforating unit is not stopping the web and being movable in the opposite direction for equally paying out the slack in the web withdrawn by the withdrawing rolls and taking up the slack in the web fed by the feeding rolls when the heat sealing and perforating means is stopping the web for equalizing and maintaining substantially constant tension in the entire fed and withdrawn web.

5. The apparatus as defined in claim 4 wherein said apparatus includes power means for actuating said heat sealing and perforating unit.

6. The apparatus as defined in claim 4 wherein said heat sealing and perforating unit includes a transverse heat sealing bar and power means for advancing said heat sealing bar against the web and retracting the same therefrom.

7. The apparatus as defined in claim 6 wherein said heat sealing and perforating unit also includes a transverse perforating bar and power means for advancing said perforating bar against the web and retracting the same therefrom.

8. The apparatus as defined in claim 4 wherein said heat sealing and perforating unit is longitudinally adjustably positioned with respect to the web.

9. The apparatus as defined in claim 4 wherein said apparatus also includes at least one additional heat sealing and perforating unit longitudinally spaced from the aforesaid heat sealing and perforating unit for also intermittently stopping said web and transversely heat sealing and perforating said web when it is so stopped.

10. The apparatus as defined in claim 9 wherein each of said heat sealing and perforating units is longitudinally adjustably positioned with respect to the web and with respect to each other.

11. The apparatus as defined in claim 4 wherein said apparatus includes power means for moving the carrier of said web tension maintaining and equalizing means.

12. The apparatus as defined in claim 4 wherein said apparatus includes power means for actuating said heat sealing and perforating unit, power means for moving the carrier of said web tension maintaining and equalizing means, and control means including means responsive to the movement of the web for operating said power means in timed relation.

13. Apparatus for continuously forming a plurality of separably connected thermoplastic bags in flattened condition in the form of a continuous web comprising in combination, means for continuously forming a web of flattened thermoplastic tubing, means including feeding rolls for simultaneously continuously longitudinally feeding said web at a substantially constant speed, a stationarily positioned heat sealing and perforating unit for intermittently positively stopping said web so continuously fed and transversely heat sealing and perforating said web when it is so stopped to provide said web with longitudinally spaced transverse heat seals and perforations defining separably connected bags therein, means including withdrawing rolls for continuously longitudinally withdrawing said heat sealed and perforated web defining the bags therein at a substantially constant speed corresponding to the substantially constant feeding speed, the continuously fed web between the feeding rolls and the heat sealing and perforating unit and the continuously withdrawn web between the heat sealing and perforating unit and the withdrawing rolls being provided with slack to allow longitudinal movement of the web and stopping of the web at the heat sealing and perforating unit for longitudinally spaced heat sealing and perforating purposes, and a web tension maintaining and equalizing means including a movable carrier having a roll engaging the fed web between the feeding rolls and the heat sealing and perforating unit and a roll engaging the withdrawn web between the heat sealing and perforating unit and the withdrawing rolls, said carrier of said web tension maintaining and equalizing means being movable in one direction for equally paying out the slack in the web fed by the feeding rolls and taking up the slack in the web withdrawn by the withdrawing rolls when the heat sealing and perforating unit is not stopping the web and being movable in the opposite direction for equally paying out the slack in the web withdrawn by the withdrawing rolls and taking up the slack in the web fed by the feeding rolls when the heat sealing and perforating means is stopping the web for equalizing and maintaining substantially constant tension in the entire fed and withdrawn web.

14. Apparatus for forming a plurality of separably connected thermoplastic bags in flattened condition in the form of a continuous web comprising in combination, means including feed rolls for continuously longitudinally feeding at a substantially constant speed a web of flattened thermoplastic tubing, a stationarily positioned heat sealing and perforating unit for intermittently positively stopping said web so continuously fed and transversely heat sealing and perforating said web when it is so stopped to provide said web with longitudinally spaced transverse heat seals and perforations defining said separably connected bags therein, means including withdrawing rolls for continuously longitudinally withdrawing said heat sealed and perforated web defining the bags therein at a substantially constant speed corresponding to the substantially constant feeding speed, the continuously fed web between the feeding rolls and the heat sealing and perforating unit and the continuously withdrawn web between the heat sealing and perforating unit and the withdrawing rolls being provided with slack to allow longitudinal movement of the web and stopping of the web at the heat sealing and perforating unit for longitudinally spaced heat sealing and perforating purposes, and a web tension maintaining and equalizing means including a movable carrier having a roll engaging the fed web between the feeding rolls and the heat sealing and perforating unit and a roll engaging the withdrawn web between the heat sealing and perforating unit and the withdrawing rolls, said carrier of said web tension maintaining and equalizing means being movable in one direction for equally paying out the slack in the web fed by the feeding rolls and taking up the slack in the web withdrawn by the withdrawing rolls when the heat sealing and perforating unit is not stopping the web and being movable in the opposite direction for equally paying out the slack in the web withdrawn by the withdrawing rolls and taking up the slack in the web fed by the feeding rolls when the heat sealing and perforating means is stopping the web for equalizing and maintainin substantially constant tension in the entire fed and withdrawn web.

15. The apparatus as defined in claim 14 wherein said apparatus includes power means for actuating said heat sealing and perforating unit.

16. The apparatus as defined in claim 14 wherein said heat sealing and perforating unit includes a transverse heat sealing bar and power means for advancing said heat sealing bar against the web and retracting the same therefrom.

17. The apparatus as defined in claim 16 wherein said heat sealing and perforating unit also includes a transverse perforating bar and power means for advancing said perforating bar against the web and retracting the same therefrom.

18. The apparatus as defined in claim 14 wherein said heat sealing and perforating unit is longitudinally adjustably positioned with respect to the web.

19. The apparatus as defined in claim 14 wherein said apparatus also includes at least one additional heat sealing and perforating unit longitudinally spaced from the aforesaid heat sealing and perforating unit for also intermittently stopping said web and transversely heat sealing and perforating said web when it is so stopped.

20. The apparatus as defined in claim 19 wherein each of said heat sealing and perforating units is longitudinally adjustably positioned with respect to the web and with respect to each other.

21. The apparatus as defined in claim 14 wherein said apparatus includes power means for moving the carrier of said web tension maintaining and equalizing means.

22. The apparatus as defined in claim 14 wherein said apparatus includes power means for actuating said heat sealing and perforating unit, power means for moving the carrier of said web tension maintaining and equalizing means, and control means including means responsive to the movement of the web for operating said power means in timed relation.

References Cited

UNITED STATES PATENTS

| | | | |
|---|---|---|---|
| 3,079,292 | 2/1963 | Garth | 156—553 X |
| 3,148,598 | 9/1964 | Davis | 156—515 X |
| 3,526,169 | 9/1970 | Levenson | 156—515 X |
| 3,414,179 | 12/1968 | Huck | 226—113 |
| 3,483,061 | 12/1969 | Takahashi et al. | 156—510 X |

BENJAMIN A. BORCHELT, Primary Examiner

J. M. HANLEY, Assistant Examiner

U.S. Cl. X.R.

93—8; 156—252; 226—113